United States Patent
Guo et al.

(10) Patent No.: US 12,173,665 B2
(45) Date of Patent: Dec. 24, 2024

(54) METHOD AND APPARATUS FOR CONTROLLING MOTORCYCLE, SYSTEM, MOTORCYCLE AND STORAGE MEDIUM

(71) Applicant: United Automotive Electronic Systems Co., Ltd., Shanghai (CN)

(72) Inventors: Shilei Guo, Shanghai (CN); Qiang Li, Shanghai (CN); Xuemin Jiang, Shanghai (CN); Xinghong Jiang, Shanghai (CN); Qiang Yu, Shanghai (CN); Yincheng Zhou, Shanghai (CN); Donglai Yang, Shanghai (CN)

(73) Assignee: United Automotive Electronic Systems Co., Ltd., Shanghai (CN)

( * ) Notice: Subject to any disclaimer, the term of this patent is extended or adjusted under 35 U.S.C. 154(b) by 0 days.

(21) Appl. No.: 18/033,402

(22) PCT Filed: Sep. 27, 2021

(86) PCT No.: PCT/CN2021/120906
§ 371 (c)(1),
(2) Date: Apr. 24, 2023

(87) PCT Pub. No.: WO2022/089118
PCT Pub. Date: May 5, 2022

(65) Prior Publication Data
US 2023/0383706 A1    Nov. 30, 2023

(30) Foreign Application Priority Data
Oct. 26, 2020   (CN) .......................... 202011154103.5

(51) Int. Cl.
*F02D 41/00* (2006.01)
*F02D 41/40* (2006.01)
*F02P 5/15* (2006.01)

(52) U.S. Cl.
CPC ......... *F02D 41/009* (2013.01); *F02D 41/401* (2013.01); *F02P 5/1504* (2013.01)

(58) Field of Classification Search
CPC .... F02D 41/00; F02D 41/009; F02D 41/0097; F02D 41/123; F02D 41/401; F02D 37/02;
(Continued)

(56) References Cited

U.S. PATENT DOCUMENTS 5,418,726 A   5/1995  Yagi
5,866,812 A   2/1999  Nishihara et al.
(Continued)

FOREIGN PATENT DOCUMENTS

CN   1623818 A   6/2005
CN   1721227 A   1/2006
(Continued)

*Primary Examiner* — Logan M Kraft
*Assistant Examiner* — Johnny H Hoang
(74) *Attorney, Agent, or Firm* — Robinson & Cole LLP

(57) ABSTRACT

The present application discloses a method and apparatus for controlling a motorcycle, a system, a motorcycle and a storage medium. The method includes: acquiring a first wheel speed signal and a second wheel speed signal; calculating a difference between the first wheel speed signal and the second wheel speed signal; detecting whether the difference satisfies a first condition, the first condition being used for detecting whether to adjust ignition timing of an engine; if the difference satisfies the first condition, detecting whether the exhaust temperature of the engine exceeds a temperature threshold; if the exhaust temperature does not exceed the temperature threshold, determining an ignition plug ignition angle of the engine according to the difference and the rotating speed of the engine; and adjusting the ignition timing of the engine according to the ignition plug ignition angle.

17 Claims, 6 Drawing Sheets

(58) Field of Classification Search
CPC ....... F02D 2200/0802; F02D 2200/101; F02D 2200/1004; F02D 2200/501; F02P 5/15; F02P 5/1504; F01N 9/00; F01N 2430/08; F01N 2900/1404; Y02T 10/40
See application file for complete search history.

(56) References Cited

U.S. PATENT DOCUMENTS

| | | | |
|---|---|---|---|
| 2006/0219455 A1* | 10/2006 | Watanabe | F02D 11/02 180/219 |
| 2011/0160973 A1* | 6/2011 | Matsuda | B60T 8/175 701/70 |
| 2016/0176369 A1* | 6/2016 | Ito | H01B 9/006 174/72 A |
| 2019/0257400 A1* | 8/2019 | Boudreau | F16H 48/24 |

FOREIGN PATENT DOCUMENTS

| | | |
|---|---|---|
| CN | 102343905 A | 2/2012 |
| CN | 104632448 A | 5/2015 |
| CN | 111086500 A | 5/2020 |
| JP | 2014190332 A | 10/2014 |

* cited by examiner

METHOD AND APPARATUS FOR CONTROLLING MOTORCYCLE, SYSTEM, MOTORCYCLE AND STORAGE MEDIUM

CROSS-REFERENCE TO RELATED APPLICATIONS

The instant application is a U.S. National Stage application of and claims priority to PCT/CN2021/120906, filed on Sep. 27, 2021, which is a PCT application of and claims priority to CN Application No. 202011154103.5, now CN 112343682 A, filed on Oct. 26, 2020, the subject matter of both aforementioned applications is hereby incorporated by reference in their entireties.

TECHNICAL FIELD

The present application relates to the technical field of engine control, in particular to a method and apparatus for controlling a motorcycle, a device, a motorcycle and a storage medium.

BACKGROUND

In the driving process of the motorcycle, the driver transmits the driving intention to the Engine Management System (EMS) by manipulating the accelerator. The EMS adjusts the output torque of the engine. The torque is transmitted to the road surface through clutch-gearbox-reducer-driving wheel. The motorcycle is driven through the friction (effective driving force) between the road surface and the tire of the driving wheel.

Under a driving situation, if the driver suddenly pulls the accelerator, the output torque of the engine will increase. If the increased torque can be fully transmitted to the road surface, unrestricted acceleration can be achieved. However, if the driving torque on the driving wheel exceeds the maximum physically-transmissible torque between the driving wheel and the road surface, the driving wheel will slip. Under another driving situation, if the motorcycle runs from a road surface with high adhesion force to a road surface with low adhesion force, the wheel will slip due to the decrease of the maximum physically-transmissible torque between the driving wheel and the road surface. Therefore, it is necessary to perform anti-slipping control on the motorcycle, adjust the traction characteristics of the motorcycle, and improve the acceleration stability of the motorcycle under the condition of ensuring the safety.

In view of this, a method for controlling a motorcycle is provided in the relevant technology, which can be used for controlling the slipping of the driving wheel of the motorcycle and includes: if an engine management system determines that a driving wheel is slipping, adjusting the ignition timing of an engine (for example, delaying ignition timing) to reduce the output torque of the engine and control the slipping.

However, the adjustment of ignition timing will lead to a higher exhaust temperature of the engine in some cases, which may damage a catalytic converter of the motorcycle, thus reducing the reliability of the motorcycle.

SUMMARY

The present application provides a method and apparatus for controlling a motorcycle, a device, a motorcycle and a storage medium, which can solve the problem of poor reliability caused by the adjustment of the ignition timing of the engine in the method for controlling the motorcycle provided in the relevant technology.

In one aspect, an embodiment of the present application provides a method for controlling a motorcycle, including: acquiring a first wheel speed signal and a second wheel speed signal, the first wheel speed signal being used for indicating the rotating speed of a first driving wheel of the motorcycle, and the second wheel speed signal being used for indicating the rotating speed of a second driving wheel of the motorcycle; detecting whether a difference between the first wheel speed signal and the second wheel speed signal satisfies a first condition, the first condition being used for determining whether to adjust ignition timing of an engine; if the difference satisfies the first condition, detecting whether the exhaust temperature of the engine exceeds a temperature threshold; if the exhaust temperature does not exceed the temperature threshold, determining an ignition plug ignition angle of the engine according to the difference and the rotating speed of the engine; and adjusting the ignition timing of the engine according to the ignition plug ignition angle.

In examples of embodiments, the step of detecting whether a difference between the first wheel speed signal and the second wheel speed signal satisfies a first condition includes: detecting whether the difference is more than a first difference threshold; if the difference is more than the first difference threshold, detecting whether the time maintained for the difference being more than the first difference threshold is more than a first time threshold; and if the time maintained for the difference being more than the first difference threshold is more than the first time threshold, detecting that the difference satisfies the first condition.

In examples of embodiments, before the step of detecting whether the difference is more than a first difference threshold, the method further includes: determining the first difference threshold from at least two first candidate difference thresholds according to the difference and the rotating speed of the engine.

In examples of embodiments, the method further includes: detecting whether the difference satisfies a second condition, the second condition being used for determining whether to adjust fuel supply of the engine; and if the difference satisfies the second condition, performing periodic fuel cutoff and fuel supply operations on the engine.

In examples of embodiments, the step of detecting whether the difference satisfies a second condition includes: detecting whether the difference is more than a second difference threshold; if the difference is more than the second difference threshold, detecting whether the time maintained for the difference being more than the second difference threshold is more than a second time threshold; and if the time maintained for the difference being more than the second difference threshold is more than the second time threshold, detecting that the difference satisfies the second condition.

In examples of embodiments, before the step of detecting whether the difference is more than a second difference threshold, the method further includes: determining the second difference threshold from at least two second candidate difference thresholds according to the difference and the rotating speed of the engine.

In examples of embodiments, the step of performing periodic fuel cutoff and fuel supply operations on the engine includes: determining the required number of the periodic fuel cutoff and fuel supply operations according to the difference and the rotating speed of the engine; and performing the periodic fuel cutoff and fuel supply operations on the engine according to the required number.

In examples of embodiments, a crankshaft angle of the engine is 720°. Every 720° of the crankshaft angle of the engine is a cycle for fuel cutoff or supply.

In examples of embodiments, after the step of performing periodic fuel cutoff and fuel supply operations on the engine, the method further includes: detecting whether the difference satisfies a third condition, the third condition being used for determining whether to stop performing the periodic fuel cutoff and supply operations on the engine; and if the difference satisfies the third condition, stopping performing the periodic fuel cutoff and supply operations on the engine.

In examples of embodiments, the step of detecting whether the difference satisfies a third condition includes: detecting whether the difference is less than a third difference threshold; and if the difference is less than the third difference threshold, determining that the difference satisfies the third condition.

In examples of embodiments, before the step of detecting whether the difference satisfies a third condition, the method further includes: determining the third difference threshold from at least two third candidate difference thresholds according to the difference and the rotating speed.

In examples of embodiments, the method further includes: calculating a difference change rate according to the first wheel speed signal and the second wheel speed signal, the difference change rate being a change rate of the difference within a predetermined time; if the difference satisfies the first condition, determining an intervention time for adjusting the ignition timing of the engine according to the difference change rate; and the step of adjusting the ignition timing of the engine according to the ignition plug ignition angle includes: adjusting the ignition timing of the engine according to the intervention time and the ignition plug ignition angle.

In examples of embodiments, the method further includes: if the difference satisfies the second condition, determining an intervention time for performing the periodic fuel cutoff and fuel supply operations on the engine; and the step of performing the periodic fuel cutoff and fuel supply operations on the engine according to the number includes: performing the periodic fuel cutoff and fuel supply operations on the engine according to the intervention time and the number.

In another aspect, an embodiment of the present application provides an apparatus or controlling a motorcycle, including: an acquisition module configured to acquire a first wheel speed signal and a second wheel speed signal, the first wheel speed signal being used for indicating the rotating speed of a first driving wheel of the motorcycle, and the second wheel speed signal being used for indicating the rotating speed of a second driving wheel of the motorcycle; and a processing module configured to calculate a difference between the first wheel speed signal and the second wheel speed signal; detect whether the difference satisfies a first condition, the first condition being used for detecting whether to adjust ignition timing of an engine; if the difference satisfies the first condition, determine an ignition plug ignition angle of the engine according to the difference and the rotating speed of the engine; and adjust the ignition timing of the engine according to the ignition plug ignition angle.

In another aspect, an embodiment of the present application provides an engine management system, wherein the system is applied to a motorcycle, the system includes a processor and a memory, the memory stores at least one instruction or program, and the instruction or program is loaded and executed by the processor to implement the method for controlling the motorcycle.

In another aspect, an embodiment of the present application provides a readable storage medium, wherein the readable storage medium stores at least one instruction or program, and the instruction or program is loaded and executed by a processor to implement the method for controlling the motorcycle.

In another aspect, an embodiment of the present application provides a motorcycle, wherein the motorcycle includes the engine management system.

The technical solution of the present application at least has the following advantages: by calculating the difference between the rotating speed of the first driving wheel and the rotating speed of the second driving wheel of the motorcycle, detecting whether to adjust the ignition timing of the engine according to the difference and the exhaust temperature of the engine, and if needed, determining the ignition plug ignition angle of the engine according to the difference and the rotating speed of the engine to adjust the slipping of the motorcycle, since the adjustment of the ignition timing needs to consider the exhaust temperature of the engine, the problem of catalytic converter damage due to the increase of exhaust temperature in the improvement of the slipping by adjusting the fuel supply of the engine in the related technology is solved, and the reliability of the motorcycle is improved; moreover, since whether to adjust the ignition timing is determined according to the difference in the rotating speed, the anti-slipping function can be enabled when the motorcycle is running at a relatively low speed, and the protection scope of the anti-slipping function is expanded.

BRIEF DESCRIPTION OF THE DRAWINGS

In order to more clearly describe the technical solution in the specific embodiments of the present application or the related technologies, the following will briefly introduce the drawings needed in the description of the specific embodiments or the related technologies. Obviously, the drawings in the following description are just some embodiments of the present application. Those skilled in the art may obtain other drawings according to these drawings without contributing any inventive labor.

DETAILED DESCRIPTION OF THE EMBODIMENTS

Figure 1:
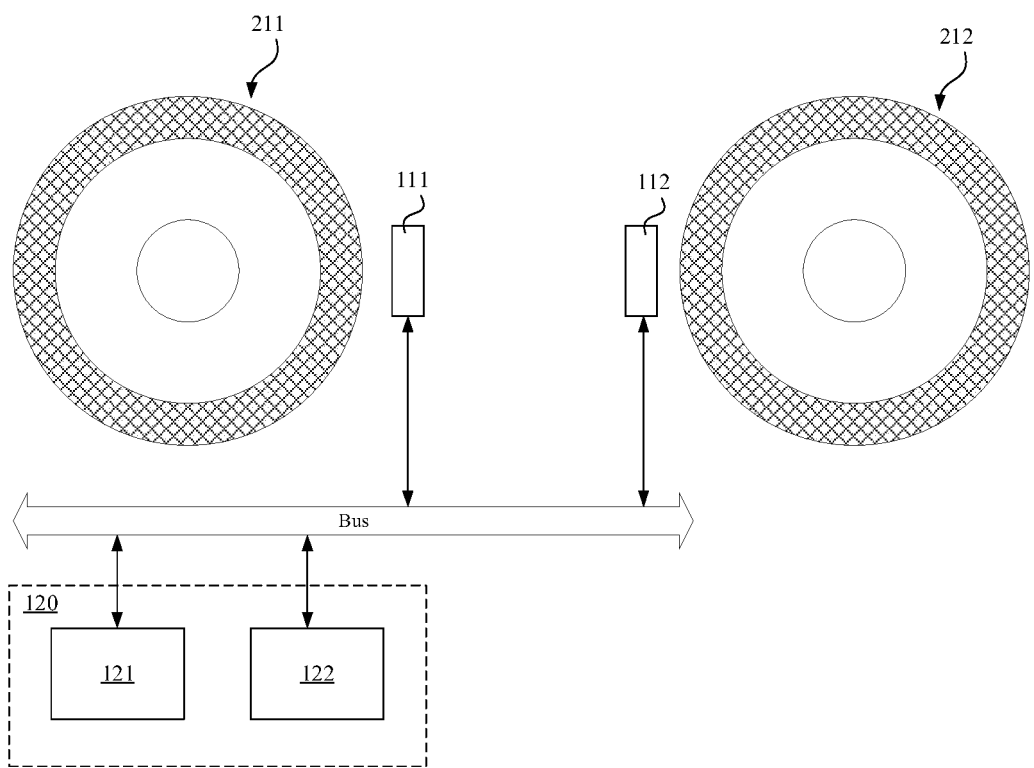
FIG. 1 illustrates a topological diagram of a system for controlling a motorcycle provided by an exemplary embodiment of the present application.

The technical solution of the present application will be clearly and completely described below with reference to the drawings. Obviously, the described embodiments are part of the embodiments of the present application, not all of them.

Based on the embodiments of the present application, all other embodiments obtained by those skilled in the art without contributing any inventive labor shall still fall within the scope of protection of the present application.

In the description of the present application, it is to be understood that the orientation or position relationship indicated by the terms "center", "up", "down", "left", "right", "vertical", "horizontal", "inside", "outside" and the like is based on the orientation or position relationship illustrated in the drawings, and is only for the convenience of describing the present application and simplifying the description, rather than indicating or implying that the apparatus or component referred to must have a specific orientation or be constructed and operated in a specific orientation, so it cannot be understood as a limitation to the present application. In addition, the terms "first", "second" and "third" are only used for descriptive purposes and cannot be understood as indicating or implying relative importance.

In the description of the present application, it is to be understood that unless otherwise specified and limited, the terms "mounting", "connected" and "connecting" should be understood in a broad sense. For example, it may mean a fixed connection, removable connection, or integrated connection; it may also mean a mechanical connection or electrical connection; it may mean a direct connection, indirect connection through an intermediate medium, internal communication of two components, wireless connection or wired connection. For those skilled in the art, the specific meanings of the above terms in the present application may be understood according to actual circumstances.

In addition, the technical features involved in different embodiments of the present application described below may be combined with each other as long as they do not conflict with each other.

Please refer to FIG. 1, which illustrates a topological diagram of a system for controlling a motorcycle provided by an exemplary embodiment of the present application. The system is provided in the motorcycle. The system includes a first sensor 111, a second sensor 112, and an engine management system 120.

The first sensor 111 is configured to generate a first wheel speed signal by sensing the rotating speed of a first driving wheel 211 of the motorcycle, and transmit the first wheel speed signal to the engine management system 120 through a bus (for example, Controller Area Network (CAN) bus) or hard wire.

In an exemplary embodiment, the first sensor 111 is provided in an Antilock Brake System (ABS) of the motorcycle. The first wheel speed signal may be transmitted to the engine management system 120 through the ABS.

The second sensor 112 is configured to generate a second wheel speed signal by sensing the rotating speed of a second driving wheel 212 of the motorcycle, and transmit the second wheel speed signal to the engine management system 120 through the bus or hard wire.

In an exemplary embodiment, the second sensor 112 is provided in the ABS of the motorcycle. The second wheel speed signal may be transmitted to the engine management system 120 through the ABS.

The engine management system 120 includes a processor 121 and a memory 122. The memory 122 stores at least one instruction or program. The instruction or program is loaded and executed by the processor 121 to implement a method for controlling a motorcycle in any one of the following embodiments.

Figure 2:
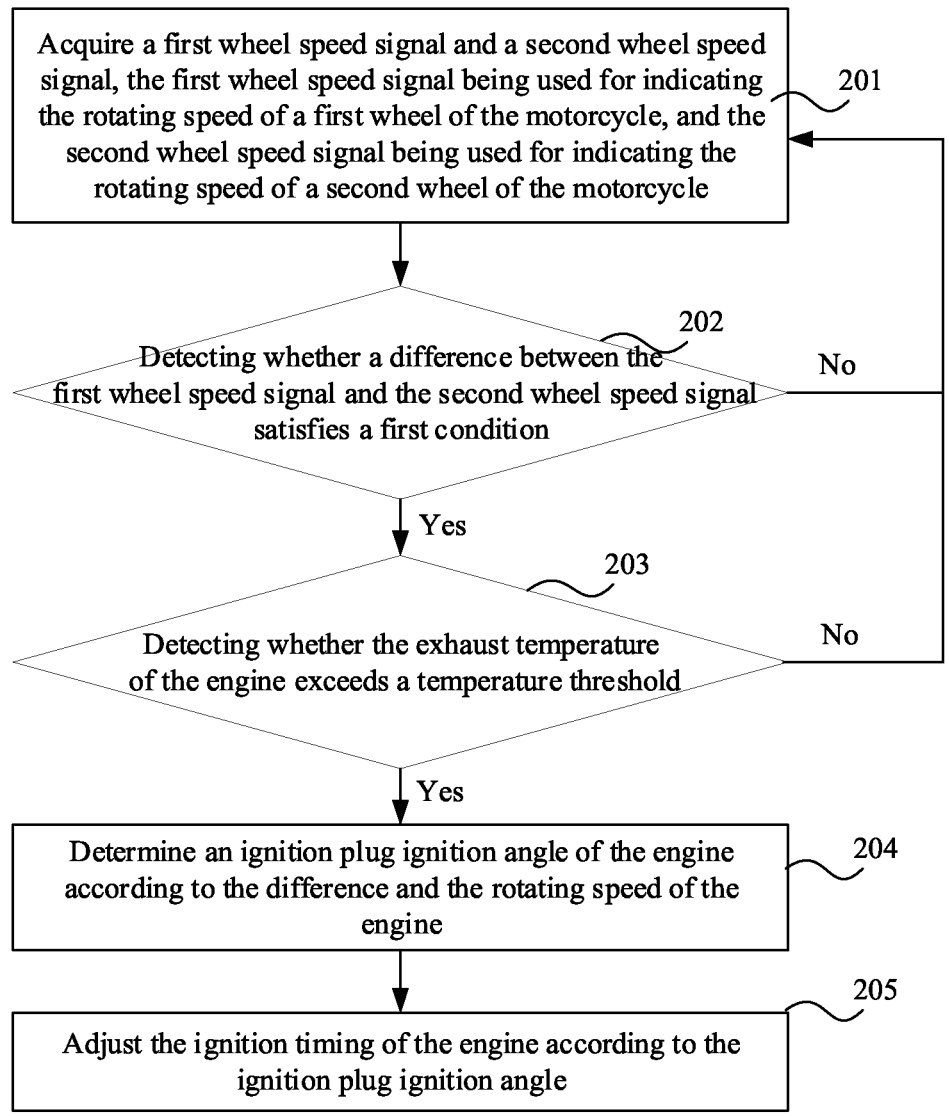
FIG. 2 illustrates a flowchart of a method for controlling a motorcycle provided by an exemplary embodiment of the present application.

Refer to FIG. 2, which illustrates a flowchart of a method for controlling a motorcycle provided by an exemplary embodiment of the present application. The method may be executed by the engine management system 120 in the embodiment illustrated in FIG. 1. The method includes the following steps:

In step 201, a first wheel speed signal and a second wheel speed signal are acquired. The first wheel speed signal is used for indicating the rotating speed of a first wheel of the motorcycle. The second wheel speed signal is used for indicating the rotating speed of a second wheel of the motorcycle.

In examples of embodiments, the first sensor senses the rotating speed of a first wheel to generate a first wheel speed signal $whl_1$, and transmits the first wheel speed signal $whl_1$ to the engine management system through a bus. The second sensor senses the rotating speed of a second wheel to generate a second wheel speed signal $whl_2$, and transmits the second wheel speed signal $whl_2$ to the engine management system through the bus. If the first wheel is a front wheel of the motorcycle, the second wheel is a rear wheel of the motorcycle. If the first wheel is the rear wheel of the motorcycle, the second wheel is the front wheel of the motorcycle.

In step 202, whether a difference between the first wheel speed signal and the second wheel speed signal satisfies a first condition is detected.

If the difference satisfies the first condition, the process goes to step 203. If the difference does not satisfy the first condition, step 201 is executed. The first condition is used for determining whether to adjust the ignition timing of the engine. The difference between the first wheel speed signal and the second wheel speed signal reflects the slipping situation of the motorcycle. Whether the motorcycle slips can be determined according to the difference, so as to determine whether to adjust the ignition timing of the engine. Moreover, since the determining condition of slipping is the difference between the rotating speeds of the wheels, the anti-slipping function can be enabled when the motorcycle is running at a relatively low speed, and the protection scope of the anti-slipping function is expanded.

In examples of embodiments, the difference between the first wheel speed signal and the second wheel speed signal $whl_{dif}$ may be the absolute value of the value of the first wheel speed signal minus the second wheel speed signal. The engine management system calculates the difference $whl_{dif}$ as: $whl_{dif}=|whl_1-whl_2|$; or, the difference $whl_{dif}$ between the first wheel speed signal and the second wheel speed signal may be the relative difference between the rotating speed signal of the front wheel and the rotating speed signal of the rear wheel. For example, if the first wheel speed signal $whl_1$ is the rotating speed signal of the front wheel and the second wheel speed signal $whl_2$ is the rotating speed signal of the rear wheel, the difference $whl_{dif}=|whl_1-whl_2|/whl_1$.

Generally, when the motorcycle slips during running, the difference between the rotating speeds of the front and rear wheels is large. Therefore, whether the anti-slipping function needs to be started may be determined by calculating the difference between the wheel speed signals that represents the difference between the rotating speeds of the front and rear wheels. Exemplarily, in an embodiment of the present application, the anti-slipping function can be achieved by at least one of the following two ways: (1) adjusting the ignition timing of the engine; (2) adjusting the fuel supply of the engine.

In step 203, whether the exhaust temperature of the engine exceeds a temperature threshold is detected.

If the exhaust temperature does not exceed the temperature threshold, the process goes to step 204. If the exhaust temperature exceeds the temperature threshold, step 201 is executed. In examples of embodiments, the temperature threshold may be from 700° C. to 1200° C. (for example, it may be 900° C.).

In step 204, an ignition plug ignition angle of the engine is determined according to the difference and the rotating speed of the engine.

Adjusting the ignition timing will cause the exhaust temperature of the engine to increase under certain conditions, thus causing potential safety hazards. In view of this, it is necessary to combine the difference between the first wheel speed signal and the second wheel speed signal and the rotating speed of the engine to determine the appropriate ignition plug ignition angle to adjust the ignition timing.

In examples of embodiments, the engine management system stores a first corresponding relationship among the difference $whl_{dif}$, the rotating speed of the engine n and the candidate ignition plug ignition angle. The engine management system queries the first corresponding relationship according to the calculated difference $whl_{dif}$ and the acquired rotating speed n, and determines the ignition plug ignition angle corresponding to the difference $whl_{dif}$ and the rotating speed n from at least two candidate ignition plug ignition angles.

For example, if the difference $whl_{dif}$ is 4 (its unit may be km/h, the same below) and the rotating speed n is 1000 (its unit may be rpm, the same below), and the corresponding candidate ignition plug ignition angle is 6°; if the difference $whl_{dif}$ is 0, the corresponding candidate ignition plug ignition angle is 0°, regardless of the rotating speed n; if the rotating speed n is 0, the corresponding candidate ignition plug ignition angle is 0°, regardless of the difference $whl_{dif}$.

In examples of embodiments, the first corresponding relationship includes a corresponding relationship among a difference range, a rotating speed range and the candidate ignition plug ignition angle. Step 204 includes but is not limited to: detecting a difference range to which the difference $whl_{dif}$ belongs; detecting a rotating speed range to which the rotating speed n belongs; querying the first corresponding relationship according to the difference range to which the difference belongs and the rotating speed range to which the rotating speed belongs, and detecting the ignition plug ignition angle corresponding to the difference $whl_{dif}$ and the rotating speed n.

For example, the candidate ignition plug ignition angle corresponding to the difference range (0, 4] and the rotating speed range (0, 1000] is 6°. If the calculated difference $whl_{dif}$=3, the acquired rotating speed n=700, since the difference $whl_{dif}$=3∈(0, 4] and the rotating speed n=700∈(0, 1000], the candidate ignition plug ignition angle corresponding to the difference $whl_{dif}$=3 and the rotating speed n=700 is 6°.

In step 205, the ignition timing of the engine is adjusted according to the ignition plug ignition angle.

After determining the ignition plug ignition angle of the engine, the engine management system adjusts the ignition timing of the engine according to the ignition plug ignition angle to improve the slipping of the motorcycle.

To sum up, in an embodiment of the present application, by calculating the difference between the rotating speed of the first wheel and the rotating speed of the second wheel of the motorcycle, determining whether to adjust the ignition timing of the engine according to the difference and the exhaust temperature of the engine, and if needed, determining the ignition plug ignition angle of the engine according to the difference and the rotating speed of the engine to adjust the slipping of the motorcycle, since the adjustment of the ignition timing needs to consider the exhaust temperature of the engine, the problem of catalytic converter damage due to the increase of exhaust temperature in the improvement of the slipping by adjusting the fuel supply of the engine in the related technology is solved, and the reliability of the motorcycle is improved; moreover, since whether to adjust the ignition timing is determined according to the difference in the rotating speed, the anti-slipping function can be enabled when the motorcycle is running at a relatively low speed, and the protection scope of the anti-slipping function is expanded.

Figure 3:
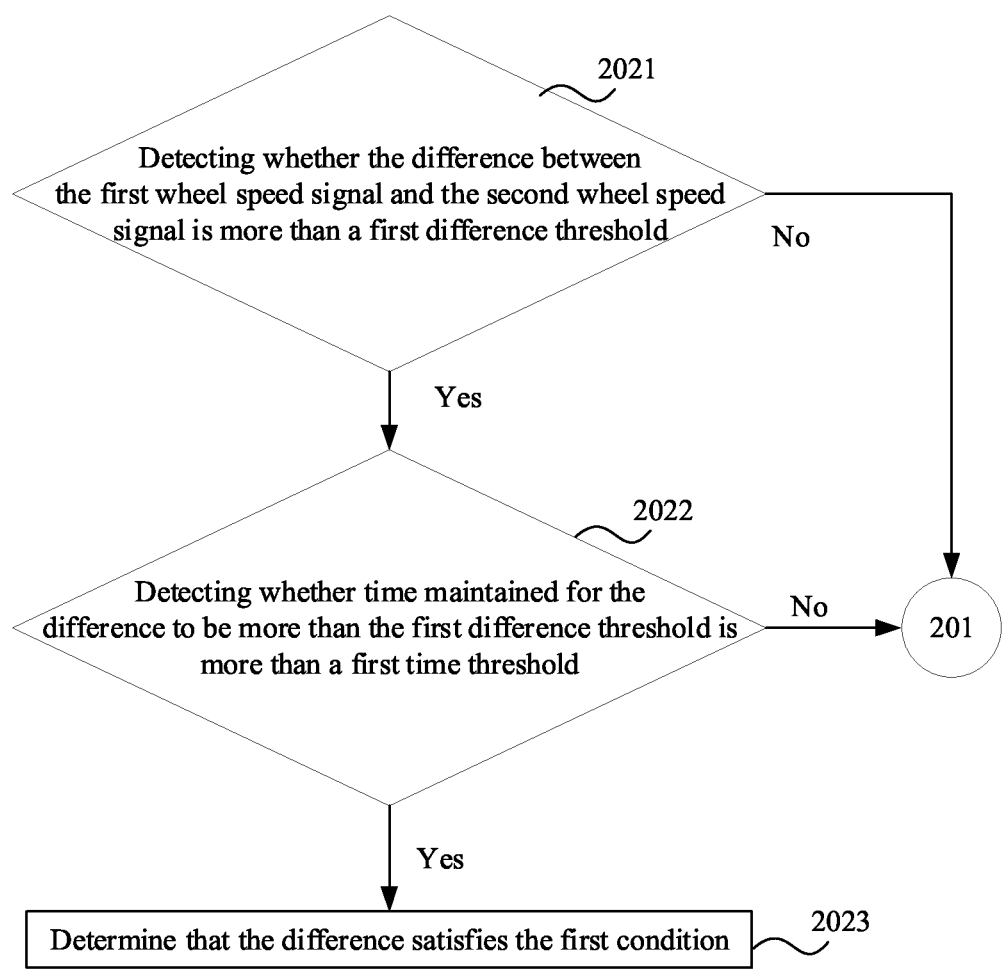
FIG. 3 illustrates a flowchart of a method for controlling a motorcycle provided by an exemplary embodiment of the present application.

Refer to FIG. 3, which illustrates a flowchart of a method for controlling a motorcycle provided by an exemplary embodiment of the present application. The method may be executed by the engine management system 120 in the embodiment illustrated in FIG. 1. The method may be an exemplary implementation of step 202 in the embodiment illustrated in FIG. 2. The method includes the following steps:

In step 2021, whether the difference between the first wheel speed signal and the second wheel speed signal is more than a first difference threshold is detected.

If the difference $whl_{dif}$ is more than the first difference threshold, the process goes to step 2022. If the difference $whl_{dif}$ is not more than the first difference threshold, the process goes to step 2021.

The difference $whl_{dif}$ reflects the slipping situation of the motorcycle. If the difference $whl_{dif}$ is larger, the slipping situation is more serious. Therefore, it is necessary to set a smaller first difference threshold to enable the anti-slipping function to intervene as soon as possible and eliminate the slipping. The purpose of introducing the rotating speed n is to limit both the wheel speed difference and the rotating speed of the engine.

In view of this, in the embodiment of the present application, it is necessary to balance the anti-slipping demand and the safety performance, and determine the matching first difference threshold according to the difference $whl_{dif}$ and the rotating speed n of the engine.

In examples of embodiments, before step 2021, the method further includes: determining the first difference threshold from at least two first candidate difference thresholds according to the difference $whl_{dif}$ and the rotating speed n.

In examples of embodiments, the engine management system stores a second corresponding relationship between the difference $whl_{dif}$, the rotating speed n and the first candidate difference thresholds. The engine management system queries the second corresponding relationship according to the calculated difference $whl_{dif}$ and the acquired rotating speed n, and determines the first difference threshold corresponding to the difference $whl_{dif}$ and rotating speed n from at least two first candidate difference thresholds.

For example, if the difference $whl_{dif}$ is 4 and the rotating speed n is 1000, the corresponding first candidate difference threshold is 4. If the difference $whl_{dif}$ is 0, the corresponding first candidate difference threshold is the upper limit of the difference $whl_{dif}$, regardless of the rotating speed n. If the rotating speed n is 0, the corresponding first candidate difference threshold is the upper limit of the difference $whl_{dif}$, regardless of the difference $whl_{dif}$.

In examples of embodiments, the second corresponding relationship includes a corresponding relationship between the difference range, the rotating speed range and the first candidate difference thresholds. The step "determining the first difference threshold from at least two first candidate difference thresholds according to the difference $whl_{dif}$ and the rotating speed n" includes but is not limited to: determining the difference range to which the difference $whl_{dif}$ belongs; determining the rotating speed range to which the rotating speed n belongs; querying the second corresponding relationship according to the difference range to which the difference $whl_{dif}$ belongs and the rotating speed range to which the rotating speed n belongs, and determining the first difference threshold corresponding to the difference $whl_{dif}$ and the rotating speed n.

For example, the first candidate difference threshold corresponding to the difference range (0, 4] and the rotating speed range (0, 1000] is 4°. If the calculated difference $whl_{dif}$=3 and the acquired rotating speed n=700, since the difference $whl_{dif}$=3∈(0, 4] and the rotating speed n=700∈(0, 1000], the corresponding first difference threshold is 4° when the difference $whl_{dif}$=3 and the rotating speed n=700 which satisfy the first condition are detected.

In step 2022, whether time maintained for the difference being more than the first difference threshold is more than a first time threshold is detected.

If the time maintained for the difference $whl_{dif}$ being more than the first difference threshold is more than the first time threshold, the process goes to step 2023. If the time maintained for the difference $whl_{dif}$ being more than the first difference threshold is not more than the first time threshold, the process is stopped or goes to step 201.

In the running process of the motorcycle, the difference $whl_{dif}$ between the first wheel speed signal and the second wheel speed signal may be more than the first difference threshold during a certain period of time, or at a time point, but the motorcycle does not slip. By detecting the time maintained for the difference $whl_{dif}$ being more than the first difference threshold, the accuracy of determining the slipping situation of the motorcycle can be improved.

In step 2023, it is detected that the difference satisfies the first condition.

To sum up, in an embodiment of the present application, by detecting whether the difference between the first wheel speed signal and the second wheel speed signal is more than the first difference threshold and detecting whether the time maintained for the difference to be more than the first difference threshold is more than the first time threshold to determine whether the first condition is satisfied, so as to determine whether to adjust the ignition timing of the engine, since the first difference threshold for determining whether the first condition is satisfied is decided by the difference between the wheel speed signals and the rotating speed, the accuracy of determining whether to adjust the ignition timing can be improved.

Figure 4:
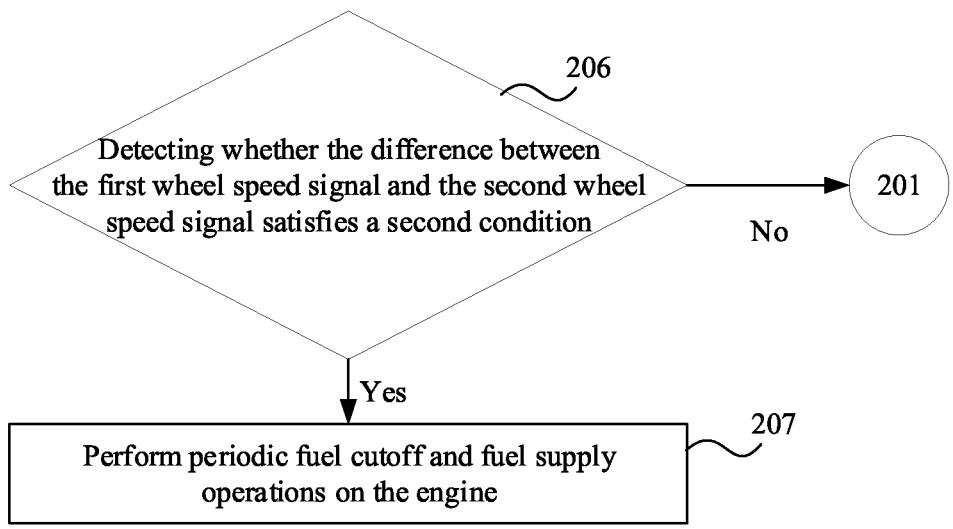
FIG. 4 illustrates a flowchart of a method for controlling a motorcycle provided by an exemplary embodiment of the present application.

Refer to FIG. 4, which illustrates a flowchart of a method for controlling a motorcycle provided by an exemplary embodiment of the present application. The method may be executed by the engine management system 120 in the embodiment illustrated in FIG. 1. The method may be an exemplary implementation on the basis of the embodiment illustrated in FIG. 2. The method includes the following steps:

In step 206, whether the difference between the first wheel speed signal and the second wheel speed signal satisfies a second condition is detected.

The second condition is used for determining whether to adjust fuel supply of the engine.

Adjusting the ignition timing to reduce the output torque can adjust the slipping situation of the motorcycle. Since the reduction of the output torque is limited, the improvement of the slipping situation of the motorcycle is limited. In view of this, in the embodiment of the present application, the second condition is introduced for determination. If the second condition is satisfied, the fuel supply of the engine is adjusted to further improve the slipping situation.

If the difference $whl_{dif}$ satisfies the second condition, the process goes to step 207. If the difference $whl_{dif}$ does not satisfy the second condition, the process is stopped or goes to step 201.

In step 207, periodic fuel cutoff and fuel supply operations are performed on the engine.

If the difference $whl_{dif}$ satisfies the second condition, periodic fuel cutoff and fuel supply operations are performed on the engine of the motorcycle. For example, a fuel supply operation is performed on the engine after t1 time after fuel cutoff of the engine; an fuel cutoff operation is performed on the engine after t2 time of fuel supply of the engine; an fuel supply operation is performed on the engine after t1 time after fuel cutoff of the engine . . . the above steps are repeated.

In examples of embodiments, step 207 includes but is not limited to: determining the required number of the periodic fuel cutoff and fuel supply operations according to the difference $whl_{dif}$ and the rotating speed n; and performing the fuel cutoff and fuel supply operations on the engine according to the determined required number.

In example of embodiments, the engine management system stores a third corresponding relationship between the difference $whl_{dif}$, the rotating speed n and candidate required numbers. The engine management system queries the third corresponding relationship based on the calculated difference $whl_{dif}$ and the acquired rotating speed n, and determines the required number corresponding to the difference $whl_{dif}$ and the rotating speed n from at least two candidate required numbers.

For example, if the difference $whl_{dif}$ is 4 and the rotating speed n is 1000, the corresponding candidate number is 1. If the difference $whl_{dif}$ is 0, the corresponding candidate required number is 0, regardless of the rotating speed n. If the rotating speed n is 0, the corresponding candidate required number is 0, regardless of the difference $whl_{dif}$.

In examples of embodiments, the third corresponding relationship includes a corresponding relationship between the difference range, the rotating speed range and the candidate required numbers. The step "querying the third corresponding relationship according to the calculated difference $whl_{dif}$ and the acquired rotating speed n, and determining the number corresponding to the difference $whl_{dif}$ and the rotating speed n from at least two candidate required numbers" includes but is not limited to: determining the difference range to which the difference $whl_{dif}$ belongs; determining the rotating speed range to which the rotating speed n belongs; query the third corresponding relationship according to the difference range to which the difference $whl_{dif}$ belongs and the rotating speed range to which the rotating speed n belongs, and determining the required number corresponding to the difference $whl_{dif}$ and the rotating speed n.

For example, the candidate number corresponding to the difference range (0, 4] and the rotating speed range (0, 1000] is 1. If the calculated difference $whl_{dif}=3$ and the acquired rotating speed n=700, since the difference $whl_{dif}=3\in(0, 4]$ and the rotating speed n=700∈(0, 1000], it is determined that the required number of the periodic fuel cutoff and fuel supply operations corresponding to the difference $whl_{dif}=3$ and the rotating speed n=700 is 1.

For example, if the determined required number is 4, the engine management system controls to perform four fuel cutoff and fuel supply operations on the engine.

In examples of embodiments, in the embodiment of the present application, a crankshaft angle of the engine is 720°. Every 720° of the crankshaft angle of the engine is a cycle for fuel cutoff or supply.

To sum up, in the embodiment of the present application, by calculating the difference between the rotating speeds of the first and second wheels of the motorcycle, determining whether to adjust the fuel supply of the engine according to the difference, and if needed, performing the periodic fuel cutoff and fuel supply operations on the engine to adjust the slipping situation of the motorcycle, the problem of limited improvement effect of the slipping situation by adjusting the ignition timing of the engine is solved, and the safety of the motorcycle is improved.

Figure 5:
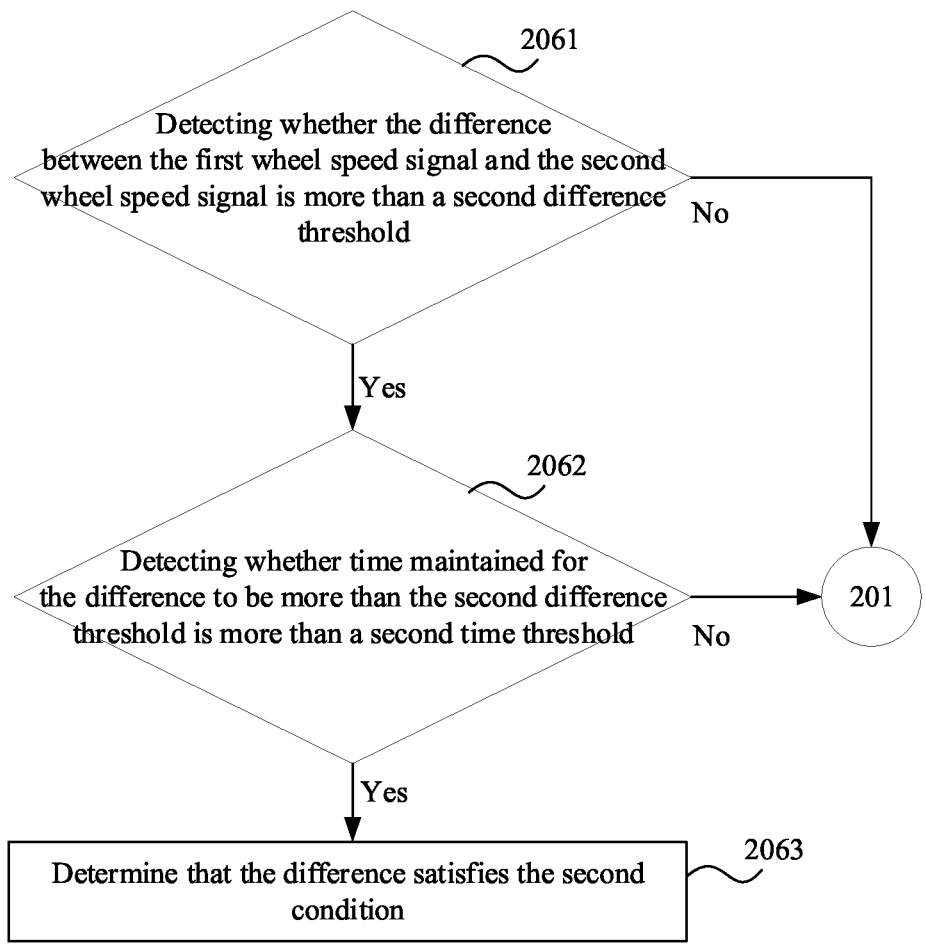
FIG. 5 illustrates a flowchart of a method for controlling a motorcycle provided by an exemplary embodiment of the present application.

Refer to FIG. 5, which illustrates a flowchart of a method for controlling a motorcycle provided by an exemplary embodiment of the present application. The method may be executed by the engine management system 120 in the embodiment illustrated in FIG. 1. The method may be an exemplary implementation of step 206 in the embodiment illustrated in FIG. 4. The method includes the following steps:

In step 2061, whether the difference between the first wheel speed signal and the second wheel speed signal is more than a second difference threshold is detected.

If the difference $whl_{dif}$ is more than the second difference threshold, the process goes to step 2062. If the difference $whl_{dif}$ is not more than the second difference threshold, the process is stopped or goes to step 201.

In examples of embodiments, before step 2061, the method further includes: determining the second difference threshold from at least two second candidate difference thresholds according to the difference $whl_{dif}$ and the rotating speed n.

In examples of embodiments, the engine management system stores a fourth corresponding relationship between the difference $whl_{dif}$, the rotating speed n and second candidate difference thresholds. The engine management system queries the fourth corresponding relationship according to the calculated difference $whl_{dif}$ and the acquired rotating speed n, and determines the second difference threshold corresponding to the difference $whl_{dif}$ and the rotating speed n from at least two second candidate difference thresholds.

For example, if the difference $whl_{dif}$ is 4 and the rotating speed n is 1000, the corresponding second candidate difference threshold is 4. If the difference $whl_{dif}$ is 0, the corresponding second candidate difference threshold is the upper limit of the difference $whl_{dif}$, regardless of the rotating speed n. If the rotating speed n is 0, the corresponding second candidate difference threshold is the upper limit of the difference $whl_{dif}$, regardless of the difference $whl_{dif}$. If the rotating speed n is 1000 and the difference $whl_{dif}$ is 8, the corresponding second candidate difference threshold is 8.

In examples of embodiments, the fourth corresponding relationship includes a corresponding relationship between the difference range, the rotating speed range and the second candidate difference thresholds. The step "querying the fourth corresponding relationship according to the calculated difference $whl_{dif}$ and the acquired rotating speed n, and determining the second difference threshold corresponding to the difference $whl_{dif}$ and the rotating speed n from at least two second candidate difference thresholds" includes but is not limited to: determining the difference range to which the difference $whl_{dif}$ belongs; determining the rotating speed range to which the rotating speed n belongs; querying the fourth corresponding relationship according to the difference range to which the difference $whl_{dif}$ belongs and the rotating speed range to which the rotating speed n belongs, and determining the second difference threshold corresponding to the difference $whl_{dif}$ and the rotating speed n.

For example, the second candidate difference threshold corresponding to the difference range (0, 4] and the rotating speed range (0, 1000] is 6°. If the calculated difference $whl_{dif}=3$ and the acquired rotating speed n=700, since the difference $whl_{dif}=3\in(0, 4]$ and the rotating speed n=700∈(0, 1000], the corresponding second difference threshold is 6° when the difference $whl_{dif}=3$ and the rotating speed n=700 which satisfy the second condition are detected.

In step 2062, whether the time maintained for the difference being more than the second difference threshold is more than a second time threshold is detected.

If the time maintained for the difference $whl_{dif}$ being more than the second difference threshold is more than the second time threshold, the process goes to step 2063. If the time maintained for the difference $whl_{dif}$ being more than the second difference threshold is not more than the second time threshold, the process is stopped or goes to step 201.

In examples of embodiments, the first time threshold is equal to the second time threshold.

By detecting the time maintained for the difference $whl_{dif}$ being more than the second difference threshold, the accuracy of determining the slipping situation of the motorcycle can be improved.

In step 2063, it is detected that the difference satisfies the second condition.

To sum up, in the embodiment of the present application, by detecting whether the difference between the first wheel speed signal and the second wheel speed signal is more than the second difference threshold and detecting whether the time maintained for the difference being more than the second difference threshold is more than the second time threshold to determine whether the second condition is satisfied, so as to determine whether to adjust the fuel supply of the engine, since the second difference threshold for determining whether the second condition is satisfied is decided by the difference between the wheel speed signals and the rotating speed, the accuracy of determining whether to adjust the fuel supply can be improved.

Figure 6:
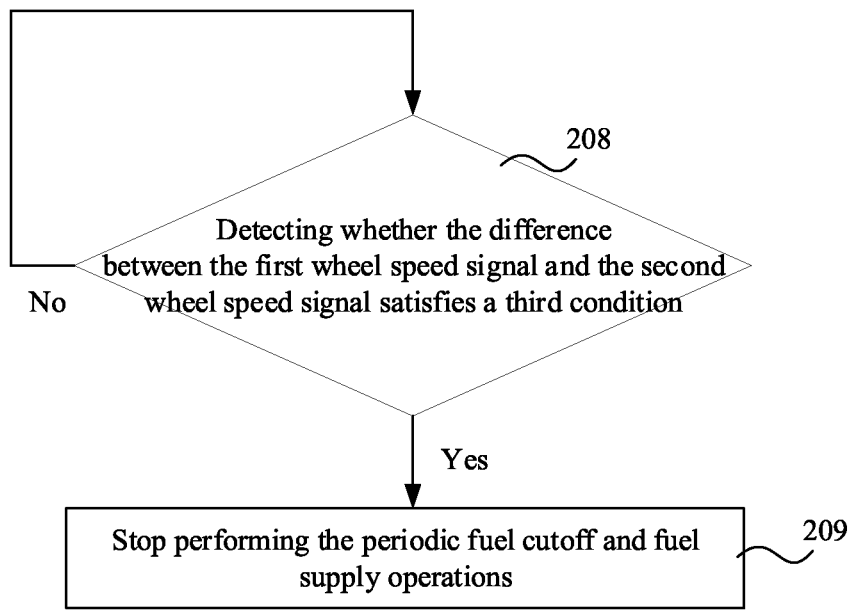
FIG. 6 illustrates a flowchart of a method for controlling a motorcycle provided by an exemplary embodiment of the present application.

Refer to FIG. 6, which illustrates a flowchart of a method for controlling a motorcycle provided by an exemplary embodiment of the present application. The method may be executed by the engine management system 120 in the embodiment illustrated in FIG. 1. The method may be a method executed after step 207 in the embodiment illustrated in FIG. 4. The method includes the following steps:

In step 208, whether the difference satisfies a third condition is detected. The third condition is used for determining whether to stop performing the periodic fuel cutoff and supply operations on the engine.

Adjusting the fuel supply of the engine will influence the driving performance of the motorcycle. In view of this, it is necessary to monitor the difference between the first wheel speed signal and the second wheel speed signal, and determine whether to continue to adjust the fuel supply of the motorcycle based on the difference.

In examples of embodiments, step 208 includes but is not limited to: detecting whether the difference is less than a third difference threshold; and if the difference is less than the third difference threshold, determining that the difference satisfies the third condition. The third difference threshold is decided by the difference $whl_{dif}$ and the rotating speed n.

If the difference $whl_{dif}$ is more than the third difference threshold, the process goes to step 209. If the difference $whl_{dif}$ is not more than the third difference threshold, the process goes to step 208.

In examples of embodiments, the engine management system stores a fifth corresponding relationship between the difference $whl_{dif}$, the rotating speed n and third candidate difference thresholds. The engine management system queries the fifth corresponding relationship according to the calculated difference $whl_{dif}$ and the acquired rotating speed n, and determines the third difference threshold corresponding to the difference $whl_{dif}$ and the rotating speed n from at least two third candidate difference thresholds.

For example, if the difference $whl_{dif}$ is 4 and the rotating speed n is 1000, the corresponding third candidate difference threshold is 2. If the difference $whl_{dif}$ is 0, the corresponding third candidate difference threshold is the upper limit of the difference $whl_{dif}$, regardless of the rotating speed n. If the rotating speed n is 0, the corresponding third candidate difference threshold is the upper limit of the difference $whl_{dif}$, regardless of the difference $whl_{dif}$. If the rotating speed n is 1000 and the difference $whl_{dif}$ is 8, the corresponding third candidate difference threshold is 4.

In examples of embodiments, the fifth corresponding relationship includes a corresponding relationship between the difference range, the rotating speed range and the third candidate difference thresholds. The step "querying the fifth corresponding relationship according to the calculated difference $whl_{dif}$ and the acquired rotating speed n, and determining the third difference threshold corresponding to the difference $whl_{dif}$ and the rotating speed n from at least two third candidate difference thresholds" includes but is not limited to: determining the difference range to which the difference $whl_{dif}$ belongs; determining the rotating speed range to which the rotating speed n belongs; querying the fifth corresponding relationship according to the difference range to which the difference $whl_{dif}$ belongs and the rotating speed range to which the rotating speed n belongs, and determining the third difference threshold corresponding to the difference $whl_{dif}$ and the rotating speed n.

For example, the third candidate difference threshold corresponding to the difference range (0, 4] and the rotating speed range (0, 1000] is 2°. If the calculated difference $whl_{dif}$=3 and the acquired rotating speed n=700, since the difference $whl_{dif}$=3∈(0, 4] and the rotating speed n=700∈(0, 1000], the corresponding third difference threshold is 2° when whether the difference $whl_{dif}$=3 and the rotating speed n=700 satisfy the third condition is detected.

In step 209, performing the periodic fuel cutoff and fuel supply operations is stopped.

To sum up, in the embodiment of the present application, by monitoring the difference between the first wheel speed signal and the second wheel speed signal, and determining whether to continue to adjust the fuel supply of the motorcycle based on the difference, the driving performance of the motorcycle can be improved by stopping adjusting the fuel supply of the engine at the right time on the premise of improving the slipping of the motorcycle.

Figure 7:
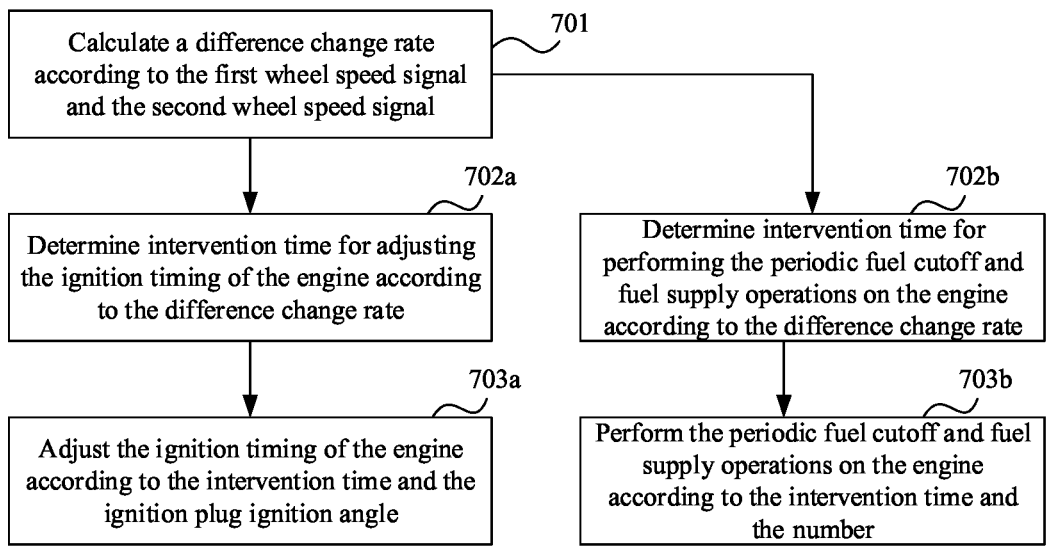
FIG. 7 illustrates a flowchart of a method for controlling a motorcycle provided by an exemplary embodiment of the present application.

Refer to FIG. 7, which illustrates a flowchart of a method for controlling a motorcycle provided by an exemplary embodiment of the present application. The method may be executed by the engine management system 120 in the embodiment illustrated in FIG. 1. The method may be an exemplary implementation on the basis of any one of the embodiments above. The method includes the following steps:

In step 701, a difference change rate is calculated according to the first wheel speed signal and the second wheel speed signal.

The difference change rate is a change rate of the difference between the first wheel speed signal and the second wheel speed signal within predetermined time. For example, if the predetermined time is 10 ms, the difference change rate d within is calculated as d=|$whl_{dif1}$−$whl_{dif2}$|, where $whl_{dif1}$ is the difference before the predetermined time and $whl_{dif2}$ is the current difference.

If the difference $whl_{dif}$ satisfies the first condition, the process goes to step 702a. If the difference $whl_{dif}$ meets the second condition, the process goes to step 702b. If the difference satisfies the first condition and the second condition at the same time, the process goes to step 702a first and then step 702b, or goes to step 702b first and then step 702a.

In step 702a, intervention time for adjusting the ignition timing of the engine is determined according to the difference change rate.

The intervention time is decided by the difference change rate d.

In examples of embodiments, the engine management system stores a sixth corresponding relationship between the difference change rate and candidate intervention time. The engine management system queries the sixth corresponding relationship according to the calculated difference change rate d, and determines the intervention time corresponding to the difference change rate d from candidate intervention time.

In examples of embodiments, the sixth corresponding relationship includes a corresponding relationship between a difference change rate range and the candidate intervention time. The step "querying the sixth corresponding relationship according to the calculated difference change rate d, and determining the intervention time corresponding to the difference change rate d from candidate intervention time" includes but is not limited to: determining the difference change rate range to which the difference change rate d belongs; querying the sixth corresponding relationship according to the difference change rate range to which the difference change rate d belongs, and determining the intervention time corresponding to the difference change rate d.

For example, the candidate intervention time corresponding to the difference change rate range (0, 1] is 0.2 s. If the difference change rate d=0.5 is calculated, since the difference d=0.5∈(0, 4=1], it is determined that the intervention time corresponding to the difference change rate d=0.5 is 0.2 s.

In step 703a, the ignition timing of the engine is adjusted according to the intervention time and the ignition plug ignition angle.

The ignition timing of the engine is adjusted according to the intervention time determined in step 702a and the ignition plug ignition angle determined in the embodiment above. For example, if the determined intervention time is 0.2 s and the determined ignition plug ignition angle is 6°, the ignition timing of the engine will be adjusted after 0.2 s to make the ignition plug ignition angle be 6°.

In step 702b, intervention time for performing the periodic fuel cutoff and fuel supply operations on the engine is determined according to the difference change rate.

The intervention time is decided by the difference change rate d.

In examples of embodiments, the engine management system stores a sixth corresponding relationship between the difference change rate and the candidate intervention time. The engine management system queries the sixth corresponding relationship according to the calculated difference change rate d, and determines the intervention time corresponding to the difference change rate d from candidate intervention time.

In step 703b, the periodic fuel cutoff and fuel supply operations are performed on the engine according to the intervention time and the number.

The periodic fuel cutoff and fuel supply operations are performed on the engine according to the intervention time determined in step 702b. For example, if the determined intervention time is 0.2 s and the determined number is 4, 4 periodic fuel cutoff and fuel supply operations will be performed on the engine after 0.2 s.

Figure 8:
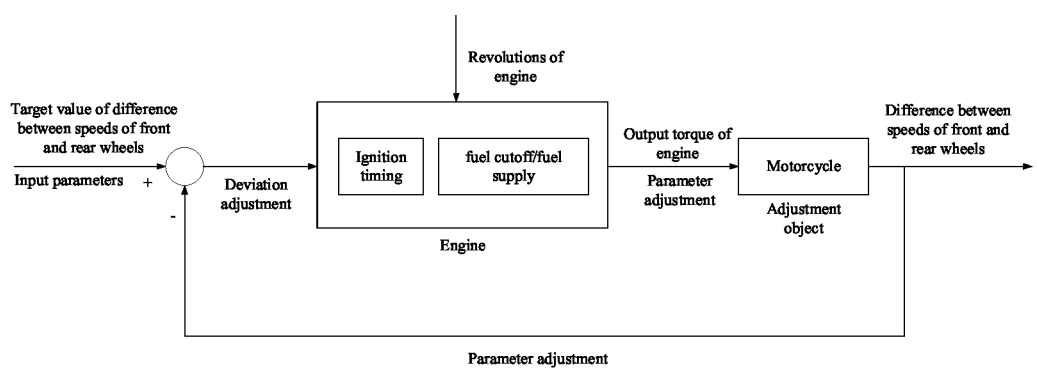
FIG. 8 illustrates an operation mechanism diagram of a system for controlling a motorcycle provided by an exemplary embodiment of the present application.

Refer to FIG. 8, which illustrates an operation mechanism diagram of a system for controlling a motorcycle provided by an exemplary embodiment of the present application. Referring to FIG. 8, the engine management system receives wheel speed signals input by sensors near front and rear wheels through a bus or other communication means. The engine management system determines whether to enable an anti-slipping function according to a difference between the speeds of the front and rear wheels and the rotating speed of the engine. After determining to enable the anti-slipping function, the engine management system changes input parameters by adjusting parameters according to the difference between the speeds of the front and rear wheels and the rotating speed of the engine, so as to adjust the deviation of the target value of the difference between the speeds of the front and rear wheels, adjust the ignition timing, and/or perform periodic fuel cutoff and fuel supply operations on the engine, adjust the output torque of the engine, and realize the control of the rotating speed of the engine and the speed of the motorcycle, thus realizing the anti-slipping function. The engine management system 120 determines the intervention speed of the anti-slipping function according to the rate of the change in difference between the speeds of the front and rear wheels.

Figure 9:
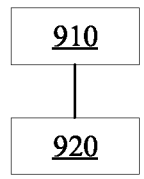
FIG. 9 illustrates a block diagram of an apparatus for controlling a motorcycle provided by an exemplary embodiment of the present application.

Refer to FIG. 9, which illustrates a block diagram of an apparatus for controlling a motorcycle provided by an exemplary embodiment of the present application. The apparatus may be applied to the engine management system 120 in the embodiment illustrated in FIG. 1. The apparatus includes an acquisition module 910 and a processing module 920.

The acquisition module 910 is configured to acquire a first wheel speed signal and a second wheel speed signal. The first wheel speed signal is used for indicating the rotating speed of a first wheel of the motorcycle. The second wheel speed signal is used for indicating the rotating speed of a second wheel of the motorcycle.

The processing module 920 is configured to calculate a difference between the first wheel speed signal and the second wheel speed signal; detect whether the difference satisfies a first condition, the first condition being used for determining whether to adjust ignition timing of an engine; if the difference satisfies the first condition, determine an ignition plug ignition angle of the engine according to the difference and the rotating speed of the engine; and adjust the ignition timing of the engine according to the ignition plug ignition angle.

In examples of embodiments, the processing module 920 is configured to detect whether the difference is more than a first difference threshold; if the difference is more than the first difference threshold, detect whether time maintained for the difference to be more than the first difference threshold is more than a first time threshold; and if the time maintained for the difference to be more than the first difference threshold is more than the first time threshold, determine that the difference satisfies the first condition.

In examples of embodiments, the processing module 920 is configured to determine the first difference threshold from at least two first candidate difference thresholds according to the difference and the rotating speed.

In examples of embodiments, the processing module 920 is configured to detect whether the difference satisfies a second condition, the second condition being used for determining whether to adjust fuel supply of the engine; and if the difference satisfies the second condition, perform periodic fuel cutoff and fuel supply operations on the engine.

In examples of embodiments, the processing module 920 is configured to determine whether the difference is more than a second difference threshold; if the difference is more than the second difference threshold, detect whether time maintained for the difference to be more than the second difference threshold is more than a second time threshold; and if the time maintained for the difference to be more than the second difference threshold is more than the second time threshold, determine that the difference satisfies the second condition.

In examples of embodiments, the processing module 920 is configured to determine the second difference threshold from at least two second candidate difference thresholds according to the difference and the rotating speed.

In examples of embodiments, the processing module 920 is configured to determine the number of the periodic fuel cutoff and fuel supply operations according to the difference and the rotating speed of the engine; and perform the periodic fuel cutoff and fuel supply operations on the engine according to the number.

In examples of embodiments, a crankshaft angle of the engine is 720°. Every 720° of the crankshaft angle of the engine is a cycle for fuel cutoff or supply.

In examples of embodiments, the processing module 920 is configured to detect whether the difference satisfies a third condition, the third condition being used for determining whether to stop performing the periodic fuel cutoff and supply operations on the engine; and if the difference satisfies the third condition, stop performing the periodic fuel cutoff and supply operations on the engine.

In examples of embodiments, the processing module 920 is configured to detect whether the difference is less than a third difference threshold; and if the difference is less than the third difference threshold, determine that the difference satisfies the third condition.

In examples of embodiments, the processing module 920 is configured to determine the third difference threshold from at least two third candidate difference thresholds according to the difference and the rotating speed.

In examples of embodiments, the processing module 920 is configured to calculate a difference change rate according to the first wheel speed signal and the second wheel speed signal, the difference change rate being a change rate of the difference within a predetermined time; if the difference satisfies the first condition, determine intervention time for adjusting the ignition timing of the engine according to the difference change rate; and adjust the ignition timing of the engine according to the intervention time and the ignition plug ignition angle.

In examples of embodiments, if the difference satisfies the second condition, the processing module 920 is configured to determine an intervention time for performing the periodic fuel cutoff and fuel supply operations on the engine; and perform the periodic fuel cutoff and fuel supply operations on the engine according to the intervention time and the number.

The present application further provides a readable storage medium. The readable storage medium stores at least one instruction or at least one segment of program, code set or instruction set. The at least one instruction or at least one segment of program, code set or instruction set is loaded and executed by a processor to implement the method for controlling the motorcycle provided in the method embodiment.

The present application further provides a computer program product including an instruction, which, when executed on a computer, causes the computer to execute the method for controlling the motorcycle in each aspect above.

The present application further provides a motorcycle. The motorcycle includes the engine management system 120 in the embodiment illustrated in FIG. 1.

Obviously, the above embodiments are just examples used for clearly describing the implementations, instead of limiting the implementations. Those skilled in the art may make other changes or variations in different forms on the basis of the description above. It is unnecessary and impossible to enumerate all the implementations here. The obvious changes or variations derived therefrom still fall within the scope of protection of the present application.

What is claimed is:

1. A method for controlling a motorcycle, comprising:
   acquiring a first wheel speed signal and a second wheel speed signal, the first wheel speed signal being used for indicating the rotating speed of a first driving wheel of the motorcycle, and the second wheel speed signal being used for indicating the rotating speed of a second driving wheel of the motorcycle;
   detecting whether a difference between the first wheel speed signal and the second wheel speed signal satisfies a first condition, the first condition being used for determining whether to adjust ignition timing of an engine;
   if the difference satisfies the first condition, detecting whether the exhaust temperature of the engine exceeds a temperature threshold;
   if the exhaust temperature does not exceed the temperature threshold, determining an ignition plug ignition angle of the engine according to the difference and the rotating speed of the engine; and
   adjusting the ignition timing of the engine according to the ignition plug ignition angle.

2. The method according to claim 1, wherein the step of detecting whether a difference between the first wheel speed signal and the second wheel speed signal satisfies a first condition comprises:
   detecting whether the difference is more than a first difference threshold;
   if the difference is more than the first difference threshold, detecting whether the time maintained for the difference being more than the first difference threshold is more than a first time threshold; and
   if the time maintained for the difference to be more than the first difference threshold is more than the first time threshold, determining that the difference satisfies the first condition.

3. The method according to claim 2, wherein before the step of detecting whether the difference is more than a first difference threshold, the method further comprises:
   determining the first difference threshold from at least two first candidate difference thresholds according to the difference and the rotating speed of the engine.

4. The method according to claim 1, wherein the method further comprises:
   detecting whether the difference satisfies a second condition, the second condition being used for determining whether to adjust fuel supply of the engine; and
   if the difference satisfies the second condition, performing periodic fuel cutoff and fuel supply operations on the engine.

5. The method according to claim 4, wherein the step of detecting whether the difference satisfies a second condition comprises:
   detecting whether the difference is more than a second difference threshold;
   if the difference is more than the second difference threshold, detecting whether time maintained for the difference being more than the second difference threshold is more than a second time threshold; and
   if the time maintained for the difference being more than the second difference threshold is more than the second time threshold, determining that the difference satisfies the second condition.

6. The method according to claim 5, wherein before the step of detecting whether the difference is more than a second difference threshold, the method further comprises:
   determining the second difference threshold from at least two second candidate difference thresholds according to the difference and the rotating speed of the engine.

7. The method according to claim 4, wherein the step of performing periodic fuel cutoff and fuel supply operations on the engine comprises:
   determining the required number of the periodic fuel cutoff and fuel supply operations according to the difference and the rotating speed of the engine; and
   performing the periodic fuel cutoff and fuel supply operations on the engine according to the required number.

8. The method according to claim 7, wherein a crankshaft angle of the engine is 720°.

9. The method according to claim 7, wherein the method further comprises:
   calculating a difference change rate according to the first wheel speed signal and the second wheel speed signal, the difference change rate being a change rate of the difference within predetermined time;
   if the difference satisfies the first condition, determining intervention time for adjusting the ignition timing of the engine according to the difference change rate; and
   the step of adjusting the ignition timing of the engine according to the ignition plug ignition angle comprises:
   adjusting the ignition timing of the engine according to the intervention time and the ignition plug ignition angle.

10. The method according to claim 9, wherein the method further comprises:

if the difference satisfies the second condition, detecting intervention time for performing the periodic fuel cutoff and fuel supply operations on the engine; and the step of performing the periodic fuel cutoff and fuel supply operations on the engine according to the number comprises:

performing the periodic fuel cutoff and fuel supply operations on the engine according to the intervention time and the number.

11. The method according to claim 4, wherein after the step of performing periodic fuel cutoff and fuel supply operations on the engine, the method further comprises:

detecting whether the difference satisfies a third condition, the third condition being used for determining whether to stop performing the periodic fuel cutoff and supply operations on the engine; and if the difference satisfies the third condition, stopping performing the periodic fuel cutoff and supply operations on the engine.

12. The method according to claim 11, wherein the step of detecting whether the difference satisfies a third condition comprises:

detecting whether the difference is less than a third difference threshold; and if the difference is less than the third difference threshold, determining that the difference satisfies the third condition.

13. The method according to claim 12, wherein before the step of detecting whether the difference satisfies a third condition, the method further comprises:

detecting the third difference threshold from at least two third candidate difference thresholds according to the difference and the rotating speed.

14. An apparatus or controlling a motorcycle, comprising:

an acquisition module configured to acquire a first wheel speed signal and a second wheel speed signal, the first wheel speed signal being used for indicating the rotating speed of a first driving wheel of the motorcycle, and the second wheel speed signal being used for indicating the rotating speed of a second driving wheel of the motorcycle; and a processing module configured to calculate a difference between the first wheel speed signal and the second wheel speed signal; detect whether the difference satisfies a first condition, the first condition being used for detecting whether to adjust ignition timing of an engine; if the difference satisfies the first condition, determine an ignition plug ignition angle of the engine according to the difference and the rotating speed of the engine; and adjust the ignition timing of the engine according to the ignition plug ignition angle.

15. An engine management system, wherein the system is applied to a motorcycle, the system comprises a processor and a memory, the memory stores at least one instruction or program, and the instruction or program is loaded and executed by the processor to implement the method for controlling the motorcycle according to claim 1.

16. A readable storage medium, wherein the readable storage medium stores at least one instruction or program, and the instruction or program is loaded and executed by a processor to implement the method for controlling the motorcycle according to claim 1.

17. A motorcycle, wherein the motorcycle comprises the engine management system according to claim 14.

* * * * *